United States Patent
Walter et al.

(10) Patent No.: US 8,730,870 B2
(45) Date of Patent: May 20, 2014

(54) SYSTEMS AND METHODS FOR WIRELESS TRANSMISSION OF PACKET-BASED DATA TO ONE OR MORE RESIDENTIAL GATEWAYS

(75) Inventors: Edward Walter, Boerne, TX (US); Andrew Augustine, Helotes, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 528 days.

(21) Appl. No.: 12/608,320

(22) Filed: Oct. 29, 2009

(65) Prior Publication Data

US 2011/0103298 A1     May 5, 2011

(51) Int. Cl.
*H04W 4/00*     (2009.01)

(52) U.S. Cl.
USPC ............ 370/328; 370/338; 370/352; 370/401

(58) Field of Classification Search
USPC ................. 370/252, 328, 338, 352, 390, 401; 455/414.2; 709/226; 398/71; 726/7
See application file for complete search history.

(56) References Cited

U.S. PATENT DOCUMENTS

| | | | |
|---|---|---|---|
| 6,115,370 A | 9/2000 | Struhsaker et al. | |
| 6,321,091 B1 * | 11/2001 | Holland | 455/414.2 |
| 6,523,064 B1 * | 2/2003 | Akatsu et al. | 709/226 |
| 7,292,560 B2 | 11/2007 | Lou et al. | |
| 7,366,203 B2 | 4/2008 | Deas | |
| 2004/0076144 A1 * | 4/2004 | Ishidoshiro | 370/352 |
| 2006/0109867 A1 | 5/2006 | Souissi | |
| 2007/0201376 A1 * | 8/2007 | Marshall-Wilson | 370/252 |
| 2008/0031229 A1 * | 2/2008 | Michelson et al. | 370/352 |
| 2008/0062902 A1 | 3/2008 | Lou et al. | |
| 2008/0189774 A1 * | 8/2008 | Ansari et al. | 726/7 |
| 2010/0158525 A1 * | 6/2010 | Walter | 398/71 |

* cited by examiner

*Primary Examiner* — Brian D Nguyen
*Assistant Examiner* — Toan Nguyen
(74) *Attorney, Agent, or Firm* — Toler Law Group, PC

(57) ABSTRACT

Methods and systems are disclosed that include receiving packet-based data at residential gateway from a service provider unit. In one embodiment, a location of a residential gateway is determined and at least a portion of the packet-based data is transmitted wirelessly to the residential gateway when the residential gateway is at an approved location.

20 Claims, 11 Drawing Sheets

SYSTEMS AND METHODS FOR WIRELESS TRANSMISSION OF PACKET-BASED DATA TO ONE OR MORE RESIDENTIAL GATEWAYS

FIELD OF THE DISCLOSURE

The present disclosure is generally related to wireless transmission of packet-based data to one or more residential gateways.

BACKGROUND

Many households and businesses receive communication services delivered to a designated location via a set top box or a gateway device. The gateway device may be coupled to many different local devices, such as a telephone, a set top box, a television, a computer, or a wireless/mobile device. Service providers frequently deliver such services to a household or business via wired connections. The wired connections can often connect customer premises equipment (CPE), such as a telephone, a cable box, or a modem, to a service provider's equipment to facilitate communication between the CPE and the service provider. The wired connections may be physically connected to multiple physical connectors, such as telephone jacks, network jacks, or cable outlets, to connect multiple types of CPE. The installation and configuration of such equipment may be inconvenient. One approach to improve the delivery of communication services involves use of wireless equipment, such as a wireless residential gateway. Such wireless gateway devices may be used to support telephone services.

A problem has been encountered when a subscriber changes their physical address but retains their telephone number. In this situation, a service provider may not have access to the new physical address of the subscriber. During an emergency call (such as an E911 call), an emergency support service needs access to the caller's physical location. Since wireless gateway devices are identified by an internet protocol (IP) address and since an IP address does not uniquely define a physical location, there is a potential problem with locating a caller that uses voice over internet protocol (VoIP) service for emergency calls. As an example, if a customer signed up for service in one location but is accessing the service from another location, an emergency call may connect to the wrong public safety answering point, potentially delaying delivery of an emergency response.

DETAILED DESCRIPTION

Systems and methods for wireless transmission of packet-based data to one or more residential gateways are disclosed. The systems and methods may enable a service provider to determine a location of one or more residential gateways. The disclosed systems and methods may further enable a service provider to block delivery of packet-based data to a residential gateway that is outside of an approved location. The disclosed systems and methods may further enable a service provider to include positioning data identifying the location of a residential gateway in content that is delivered to and from the service provider. For example, positioning data may be included in a phone call to an emergency services provider.

In a first particular embodiment, a system is disclosed that includes a wired network interface configured to receive packet-based data. The system further includes a location determination module configured to determine a location of one or more residential gateways and a wireless network interface configured to transmit at least a portion of the packet-based data to the one or more residential gateways.

In a second particular embodiment, a residential gateway is disclosed that includes a wireless network interface configured to receive packet-based data from at least one service provider unit of a plurality of service provider units. The residential gateway further includes a routing module configured to route the received packet-based data to one or more devices coupled to the residential gateway. The residential gateway further includes a location determination module configured to determine a location of the residential gateway.

In a third particular embodiment, a method is disclosed that includes receiving, at a service provider unit configured to transmit packet-based data to a plurality of residential gateways, positioning data from the plurality of residential gateways. The positioning data from a particular residential gateway may include at least one distance between the particular residential gateway and another residential gateway. The method further includes determining a gateway location map at least partially based on the positioning data from the plurality of residential gateways. The gateway location map may be useable to determine a particular location of the particular residential gateway. The method further includes requesting an update of the positioning data from the plurality of residential gateways.

Figure 1:
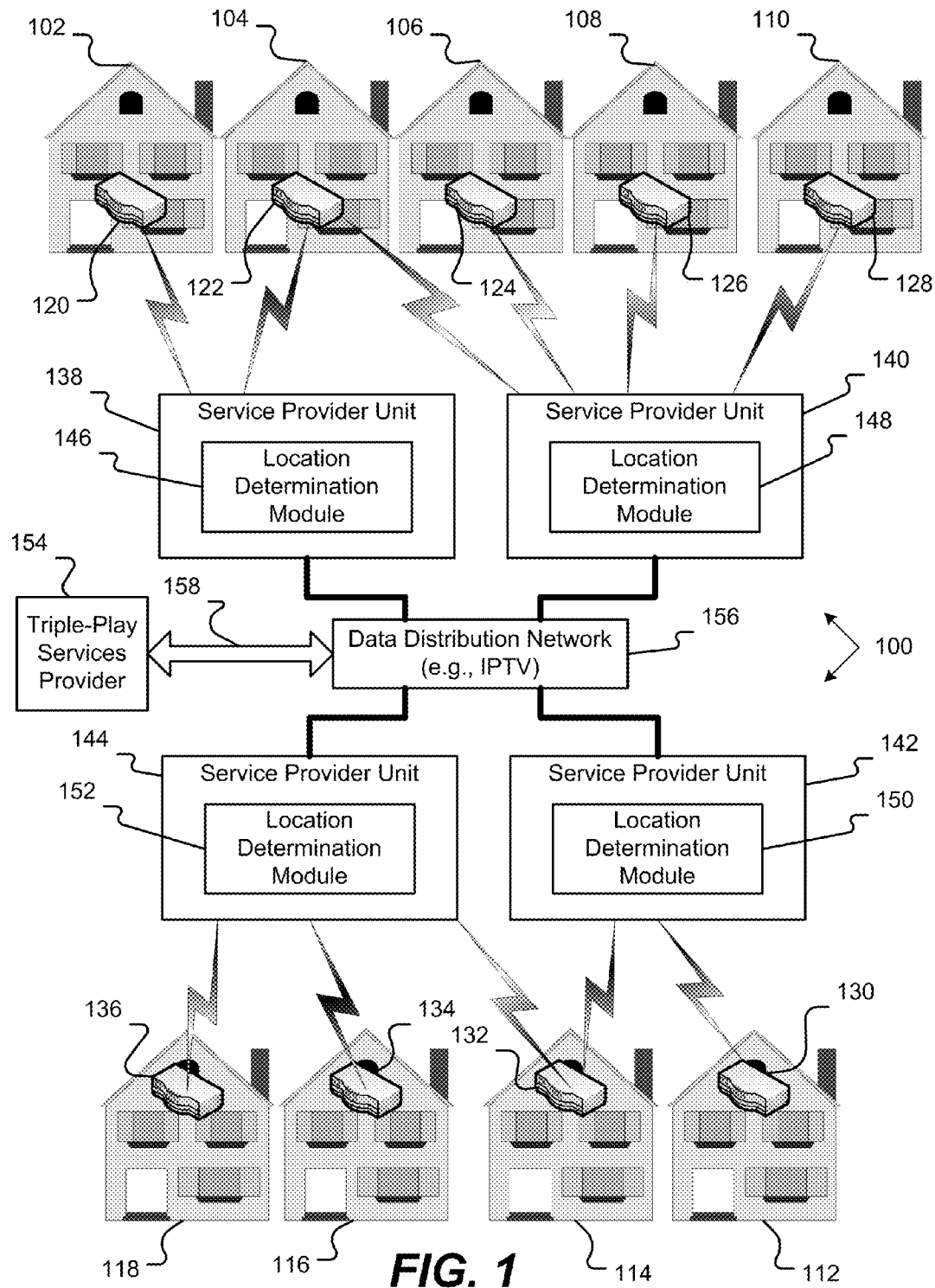
FIG. 1 is a block diagram of a first particular embodiment of a system to wirelessly transmit packet-based data to one or more residential gateways.

Referring to FIG. 1, a distributed communication system 100 is illustrated. The distributed communication system 100 includes a data distribution network 156 coupled via a data communication path 158 to a service provider 154. In a particular embodiment, the service provider offers triple-play services (data, voice, and video). In another embodiment, the service provider may be any provider of packet-based data. The data distribution network 156 is coupled to a plurality of service provider units. For example, the data distribution network 156 is shown to be coupled to a first service provider unit 138, a second service provider unit 140, a third service provider unit 144, and a fourth service provider unit 142. While four service provider units have been shown, it should be understood that one or more service provider units may be coupled to the data distribution network 156.

Each of the service provider units includes a location determination component. For example, the first service provider unit 138 includes a location determination module 146. Similarly, the second service provider unit 140 includes location determination module 148. The third service provider unit 144 includes a location determination module 152 and the fourth service provider unit 142 includes a location determination module 150. In a particular embodiment, the data distribution network 156 is an internet protocol television (IPTV) communication network.

Each of the service provider units also includes an encryption module configured to encrypt packet-based data prior to transmission. For example, the first service provider unit 138 includes an encryption module 160. Similarly, the second service provider unit 140 includes an encryption module 162. The third service provider unit 144 includes an encryption module 166, and the fourth service provider unit 142 includes an encryption module 164. The packet-based data may be encrypted by a particular encryption module, for example, using an asymmetric key algorithm or by using a symmetric key algorithm.

Each of the service provider units is coupled to one or more residential gateways via a wireless connection. For example, the first service provider unit 138 is coupled to a first residential gateway 120 and is coupled to a second residential gateway 122 via a wireless link. An example of wireless technology that may be utilized includes short range or intermediate range wireless technology such as 802.11, 802.16, ultra wide band, and other wireless technologies suitable for delivery of data communications. The first residential gateway 120 is located within a first residence 102 and the second residential gateway 122 is located within a second residence 104. In a similar manner, multiple residences 106, 108, 110, 112, 114, 116, and 118 are illustrated and each residence houses at least one of a plurality of residential gateways 124, 126, 128, 130, 132, 134, and 136.

In the illustrated embodiment, the second service provider unit 140 communicates wirelessly with the second residential gateway 122, a third residential gateway 124, a fourth residential gateway 126, and a fifth residential gateway 128. The third service provider unit 144 communicates wirelessly with a sixth residential gateway 136, a seventh residential gateway 134, and an eighth residential gateway 132. The fourth service provider unit 142 communicates wirelessly with the eighth residential gateway 132 and the ninth residential gateway 130.

The location determination modules 146, 148, 150, and 152 may be implemented in software or hardware. For example, the location determination modules 146, 148, 150, and 152 may include instructions to determine a location of one or more residential gateways in communication therewith. For example, the first service provider unit 138 may use the location determination module 146 to determine a location of the first residential gateway 120 or the second residential gateway 122. In another embodiment, a location determination module receives location data from one or more of the residential gateways. For example, each of the residential gateways 120 and 122 may include a global positioning system (GPS) receiver or other location determining device and each of the residential gateways 120 and 122 may communicate measured location data to the service provider unit 138. Such location data may be stored within the location determination module 146. Alternatively, one or more triangulation techniques may be used by the location determination module 146. Through triangulation techniques, the location determination module 146 is able to determine, measure, or otherwise estimate locations of one or more of the residential gateways in communication wirelessly therewith. In a particular embodiment, the service provider unit 138 is at a known fixed location. Thus, the service provider unit 138 may utilize triangulation methods and may process location measurement data received from one or more of the residential gateway units to determine a location of a residential gateway.

Each service provider unit includes a wireless interface to communicate wirelessly with the residential gateways and includes a wired interface to communicate with the data distribution network 156. Thus, each service provider unit may be implemented as a fixed unit having a fixed location and having both wired and wireless interface capabilities. Each service provider unit may be a computing system that includes a wired network interface configured to receive packet-based data. For example, the service provider unit 138 may have a wired interface to the data distribution network 156 and may receive packet-based data from the data distribution network 156. The service provider unit 138 may further include a wireless network interface configured to transmit at least a portion of the packet-based data to one or more of the residential gateways. For example, the service provider unit 138 may receive packet-based data from the data distribution network 156 and subsequently transmit the packet-based data to the first residential gateway 120, the second residential gateway 122, or both residential gateways 120 and 122. The service provider unit 138 may only transmit a portion of the packet-based data to the residential gateways 120 and 122 because some portion of the packet-based data may not be of interest to or may not be designated for routing to the residential gateways 120 and 122. For example, control data such as packet headers, checksums, and other routing data may not be transmitted to the residential gateways 120 and 122.

Each service provider unit may further provide a packet filtering function to selectively provide some portion of the packet-based data, but not all packet-based data, to a selected residential gateway. As an example, the first service provider unit 138 may determine, based on location data generated by the location determination module 146, that a representative residential gateway (e.g., residential gateway 122) is at an unauthorized location. In this event, the first service provider unit 138 may discontinue transmission of some or all packet-based data to the identified residential gateway 122 at the unauthorized location. For example, the first service provider unit 138 may discontinue transmission of IPTV data to the residential gateway 122 at the unauthorized location.

Packet-based data may be received by a service provider unit from a service provider via the data distribution network 156. The data distribution network 156 may receive packet-based data from the services provider over the communication path 158. In a particular embodiment, the communication path 158 may provide delivery of data over an optical link, a twisted pair link, a coaxial cable, wireless medium, or any combination thereof. Thus, the service provider operating the data distribution network 156 may be a communication service provider that utilizes optical technology, cable technologies, or similar communication delivery mechanisms.

The system 100 illustrated in FIG. 1 may enable simplified installation of services via use of wireless residential gateway devices. In addition, service provider units may be utilized to identify location information for subsequent delivery of services. For example, the service provider units may be used to obtain location data that may be utilized by voice over IP (VoIP) services provided to respond to emergency calls. As an example, a user of a residential gateway may place a 911 call and a service provider unit, having access to the location of the residential gateway, may correctly route the call to an emergency support center. Thus, a wireless residential gateway supported by a service provider unit as shown in the system 100 of FIG. 1 may be utilized to support VoIP services where emergency calls are requested.

Figure 2:
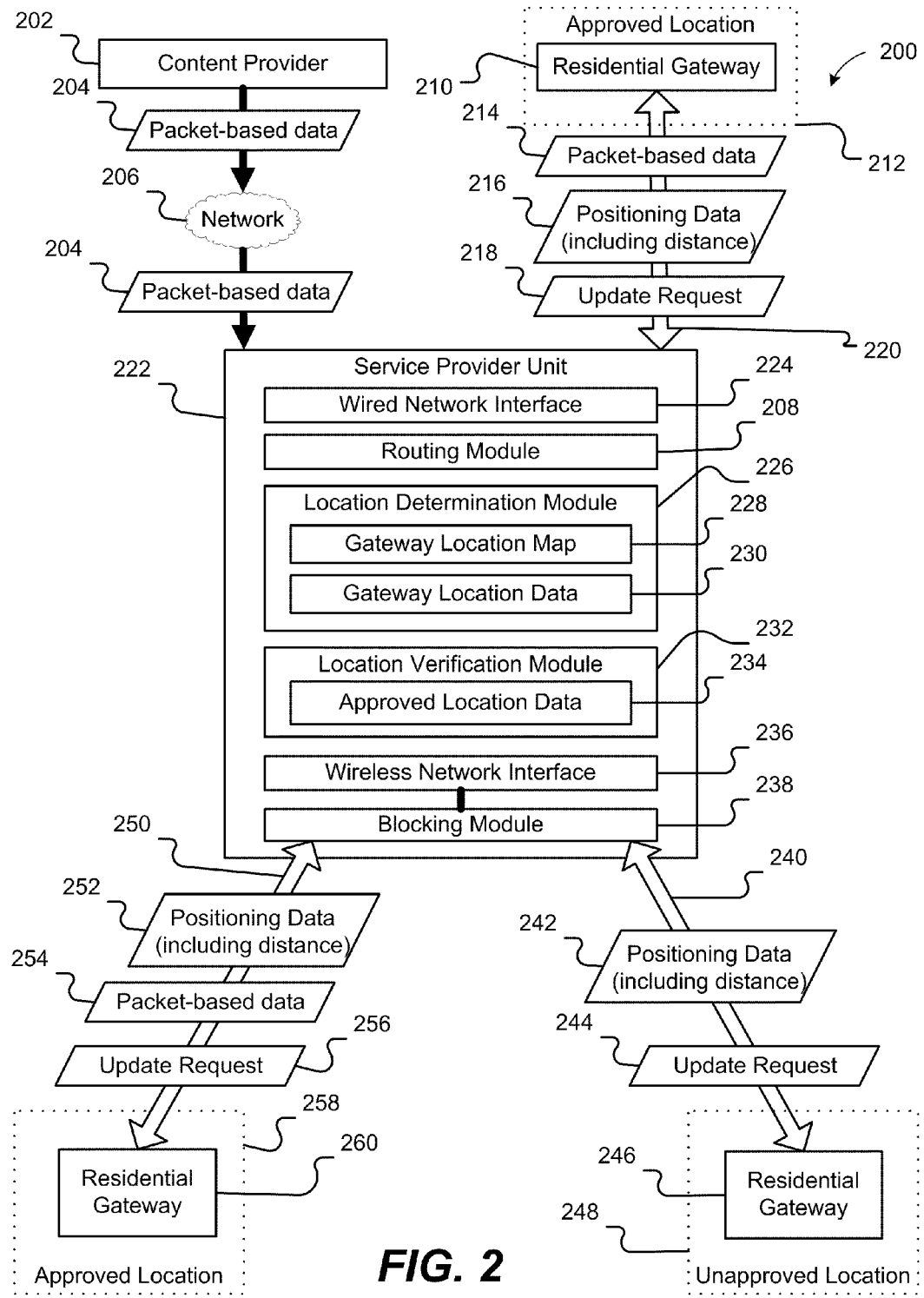
FIG. 2 is a block diagram of a second particular embodiment of a system to wirelessly transmit packet-based data to one or more residential gateways.

Referring to FIG. 2, a system 200 for wireless delivery of packet-based data to one or more residential gateways is illustrated. The system 200 includes a content provider 202, a service provider unit 222, a first residential gateway 210, a second residential gateway 246, and a third residential gateway 260. The service provider unit 222 is coupled to the content provider 202 via a network 206. The service provider unit 222 is further coupled to the residential gateways 210, 246, and 260 via data communication paths 220, 240, and 250. The service provider unit 222 includes a wired network interface 224, a routing module 208, a location determination module 226, a location verification module 232, a wireless network interface 236, and a blocking module 238.

The location determination module 226 includes a gateway location map 228 and gateway location data 230. The gateway location data 230 describes the location of one or more residential gateways, such as the first residential gateway 210, the second residential gateway 246, and the third residential gateway 260. The gateway location data may be embodied, for example, as GPS coordinates or as an angle and distance from a service provider unit. The gateway location map 228 is constructed at least partially based on the positioning data from a plurality of residential gateways. For example, the gateway location map 228 may be constructed based on positioning data such as the gateway location data 230. The gateway location map 228 may be embodied as a table of distances to a plurality of residential gateways, a table of coordinate locations for a plurality of residential gateways, or a graphical representation of the locations of a plurality of residential gateways.

The location verification module 232 includes approved location data 234. Approved location data 234 defines an approved location for one or more residential gateways. For example, the approved location data 234 can define an approved location 212 of the first residential gateway 210, an approved location (not shown) of the second residential gateway 246, and an approved location 258 of the third residential gateway 260. In a particular embodiment, packet-based data may be transmitted to a particular residential gateway when the residential gateway is at an approved location. Conversely, packet-based data may be blocked from transmission to a particular residential gateway when the particular residential gateway in not at an approved location. For example, packet-based data may be blocked from transmission to the second residential gateway 246 by the blocking module 238 because the second residential gateway 246 is at an unapproved location 248.

During operation, the service provider unit 222 receives packet-based data 204 from the content provider 202 via the network 206. The service provider unit 222 may transmit the packet-based data 204 to any residential gateway that is at an approved location. In order to determine whether a particular residential gateway is at an approved location, the service provider unit 222 may compare positioning data for the particular residential gateway to approved location data 234 via the location verification module 232.

For example, the service provider unit 222 may receive positioning data 216 from the first residential gateway 210, positioning data 242 from the second residential gateway 246, and positioning data 252 from the third residential gateway 260. In an illustrative embodiment, the positioning data 216, 242, and 252 may include a distance between the particular residential gateway transmitting the positioning data 216, 242, and 252 and another residential gateway. The service provider unit 222, via the location verification module 232, may subsequently determine whether a particular residential gateway is located at an approved location by comparing the positioning data 216, 242, and 252 to the approved location data 234.

Responsive to determining that a particular residential gateway is at an approved location, the service provider unit 222 may transmit packet-based data to the particular residential gateway. For example, the service provider unit 222 can transmit first packet-based data 214 to the first residential gateway 210 that is at a first approved location 212. The service provider unit 222 may further transmit second packet-based data 254 to the third residential gateway 260 that is at a second approved location 258.

Packet-based data may be blocked from transmission to the second residential gateway 246 that is at an unapproved location 248 by the blocking module 238. In addition, packet-based data may be transmitted to the second residential gateway 246 that is at the unapproved location 248, but receipt of such packet-based data may be blocked by a blocking module (not shown) at the second residential gateway 246 itself. The system 200 may therefore enforce location restrictions at the service provider unit 222, at the residential gateways 210, 246, 260, or any combination thereof. For example, packet-based data that is broadcast to a plurality of residential gateways may be blocked, as appropriate, by the residential gateways 210, 246, 260 while packet-based data that is directed to a single residential gateway may be blocked, as appropriate, by the service provider unit 222.

The service provider unit 222 may automatically receive updated positioning data from a particular residential gateway. Such updated positioning data may be received, for example, according to a schedule, at the request of the service provider unit 222, or when the location of a particular residential gateway has changed. For example, the service provider unit 222 may send a first request 218 for updated positioning data to the first residential gateway 210. In addition, the service provider unit 222 may submit a second request 256 for updated positioning data to the second residential gateway 260 and a third request 244 for updated positioning data to the third residential gateway 246.

The system 200 therefore may enable a service provider to maintain accurate and up-to-date location information for a plurality of residential gateways. In addition, a consumer of services delivered via the residential gateway is not required to provide updated address information or other location identifying information because the system can periodically re-determine the location of the residential gateway. The service provider can therefore provide communication services to a residential gateway in compliance with contracted terms of use and in compliance with applicable laws.

Figure 3:
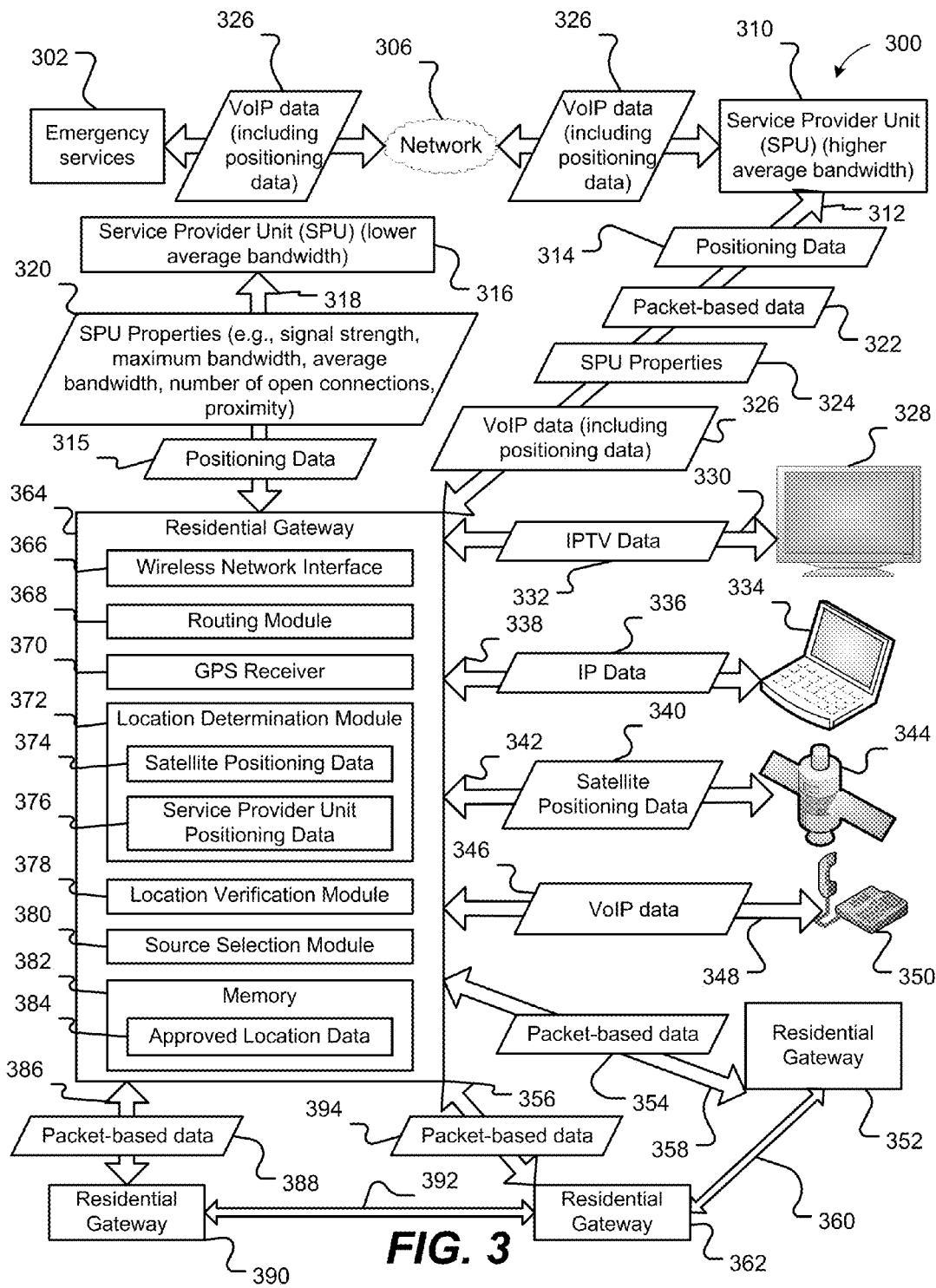
FIG. 3 is a block diagram of a third particular embodiment of a system to wirelessly transmit packet-based data to one or more residential gateways.

Referring to FIG. 3, a system 300 for wireless delivery of packet-based data to one or more residential gateways is illustrated. The system 300 includes a residential gateway 364 that is coupled to a first service provider unit 310 via a data communication path 312. The residential gateway 364 is also coupled to a second service provider unit 316 via a data communication path 318. The service provider units 310 and 316 are similar to the service provider unit 222 described above with reference to FIG. 2. The service provider units 310 and 316 may be coupled to a plurality of external sources capable of delivering a particular service to a residential gateway coupled to the service provider units 310 and 316. For example, the first service provider unit 310 may be coupled to a provider of emergency services 302, such as E911 services, via a network 306.

The residential gateway 364 may be coupled to additional residential gateways 352, 362, and 390 via communication paths 358, 356, and 386. The additional residential gateways 352, 362, 390 may also be coupled together via data communication paths 392 and 360. Although not shown in FIG. 3, the additional residential gateways 352, 362, and 388 may include all of the components and functionality of the residential gateway 364.

The residential gateway 364 may also be coupled to a plurality of other electronic devices. For example, the residential gateway 364 may be coupled to a television 328 via a data communication path 330. The residential gateway 364 may further be coupled to a personal computer 334 via a data communication path 338 and additionally coupled to a telephone 350 via a data communication path 348. In this embodiment, the residential gateway 364 may also be coupled to a data communication satellite such as a GPS satellite 344. In addition to the electronic devices illustrated in FIG. 3, the residential gateway 364 may also be coupled to one or more of a set top box (STB), a mobile communication device, a home appliance, a security apparatus, a multi media player, and a gaming console.

The residential gateway 364 includes a wireless network interface 366, a routing module 368, a GPS receiver 370, a location determination module 372, a location verification module 378, a source selection module 380, and memory 382. The location determination module 372 may be used to determine the location of the residential gateway 364, as well as the location of one or more service provider units. For example, the residential gateway 364 can include service provider positioning data 376 that identifies the location of the first service provider unit 310 and the second service provider unit 316. The location of a particular service provider unit may include, for example, GPS coordinates for the service provider unit or a relative location to the residential gateway 364, such as a distance and angle relative to the residential gateway 364.

The location determination module 372 may also include satellite positioning data 374 that identifies the location of the residential gateway 364 itself. For example, the satellite positioning data 374 may include satellite positioning data 340 received from the GPS satellite 344. Such satellite positioning data may be received at the residential gateway 364 via the GPS receiver 370. In another embodiment, the location determination module 372 may be configured to receive positioning data associated with at least two service provider units of the plurality of service provider units and to determine the location of the residential gateway based on the positioning data. For example, the residential gateway 364 may receive positioning data 314 from the first service provider unit 310 and positioning data 315 from the second service provider unit 316. Such positioning data 314 and 315 may identify the location of each service provider unit 310 and 316, as well as an angle and distance between each service provider unit 310 and 316 and the residential gateway 364 so that the residential gateway may determine its location via the location determination module 372.

The memory 382 of the residential gateway 364 may include approved location data 384. The approved location data 384 may define approved locations for one or more residential gateways, such as the additional residential gateways 352, 362, and 390. The residential gateway 364 may use the approved location data 384 to determine which of the additional residential gateways 352, 362, and 390 can receive packet-based data 354, 394, and 384 from the residential gateway 364. Because the residential gateway 364 has access to approved location data 384 and the residential gateway may determine its own location via the location determination module 372, the residential gateway 364 may enforce location restrictions. For example, the residential gateway 364 may include some mechanism to enforce location restrictions such that the wireless network interface 366 of the residential gateway 364 is precluded from receiving packet-based data from the service provider units 310 and 316 when the residential gateway 364 is not at an approved location.

During operation, the residential gateway 364 may be configured to receive packet-based data 322 from one or more service provider units, such as the service provider unit 316 and the service provider unit 310. The packet-based data 322 may include VoIP data, IPTV data, Internet data, or any combination thereof. The residential gateway 364 may be configured to communicate at least a portion of the packet-based data 322 with a plurality of consumer electronic devices as determined by routing logic, such as the routing module 368. For example, the residential gateway 364 may transmit IPTV data 332 to the television 328. In addition, the residential gateway 364 may transmit IP data 336 to the personal computer 334. As an additional example, the residential gateway 364 may transmit VoIP data 346 to the telephone 350. In addition, residential gateway 364 may transmit at least a portion of the packet-based data 322 with the additional residential gateways 390, 362, and 352.

In one embodiment, the residential gateway 364 may be configured to selectively request the packet-based data from one service provider unit at least partially based on a property associated with the service provider unit. Such properties may include a signal strength associated with the service provider unit, a maximum bandwidth of each service provider unit, an average bandwidth of each service provider unit, a number of open connections at each service provider unit, and a proximity of each service provider unit to the residential gateway. For example, a first set of service provider unit (SPU) properties 324 may be transmitted from the first service provider 310 to the residential gateway 364. In addition, a second set of service provider unit properties 320 may be transmitted to the residential gateway 364 by the second service provider unit 316.

The residential gateway 364, via the source selection module 380, may examine the service provider unit properties 320 and 324 to determine which service provider unit 310 and 320 to request packet-based data 322 from. In FIG. 3, for example, the first service provider unit 310 has a higher average bandwidth than the second service provider unit 316. In such an example, the residential gateway 364 is configured to direct requests for packet-based data 322 to the first service provider unit 310 and not to the second service provider unit 316. The service provider unit properties 320 and 324 may be updated and transmitted to the residential gateway 364 according to a set schedule, at the request of the residential gateway 364, or at a time determined by a particular service provider unit.

In an alternative embodiment, the source selection module 380 may be further configured to evaluate service provider units as a potential source for packet-based data, and the source selection module 380 may also be configured to evaluate other residential gateways as a potential source for packet-based data. For example, the source selection module 380 may be configured to selectively request packet-based data from the additional residential gateways 352, 362, and 390 in response to determining that a connection between the residential gateway 364 and the service provider units 310 and 316 has terminated.

Because the residential gateway 364 may be capable of determining its own location via the location determination module 372, the residential gateway 364 may embed positioning data in packet-based data transmitted from the residential gateway 364. For example, the residential gateway 364 may embed positioning data in VoIP data 346 originated at the telephone 350, thereby producing enhanced VoIP data 326. The enhanced VoIP data 326 may be received by a service provider unit and transmitted to a provider of location critical services. For example, the enhanced VoIP data 326 may be transmitted from the residential gateway 364 to the first service provider unit 310 for subsequent transmission to an emergency services provider 302 via the network 306. The positioning data may be utilized by the emergency services provider 302 to reliably direct emergency services, such as an ambulance and paramedics, to a person placing a call at the telephone 350 that is connected to the residential gateway 364.

The residential gateway 364 is also coupled to additional residential gateways 390, 362, 352. A particular residential gateway may therefore receive packet-based data from another residential gateway. For example, the residential gateway 364 may receive packet-based data 388, packet-based data 394, and the packet-based data 354, from residential gateways 390, 362, and 352, respectively. The residential gateways are therefore not subject to a single point of failure as would be the case if the residential gateway was permitted to only connect to one service provider unit. Enabling the residential gateway to communicate with other residential gateways increases redundancy and therefore provides for improved reliability.

Figure 4:
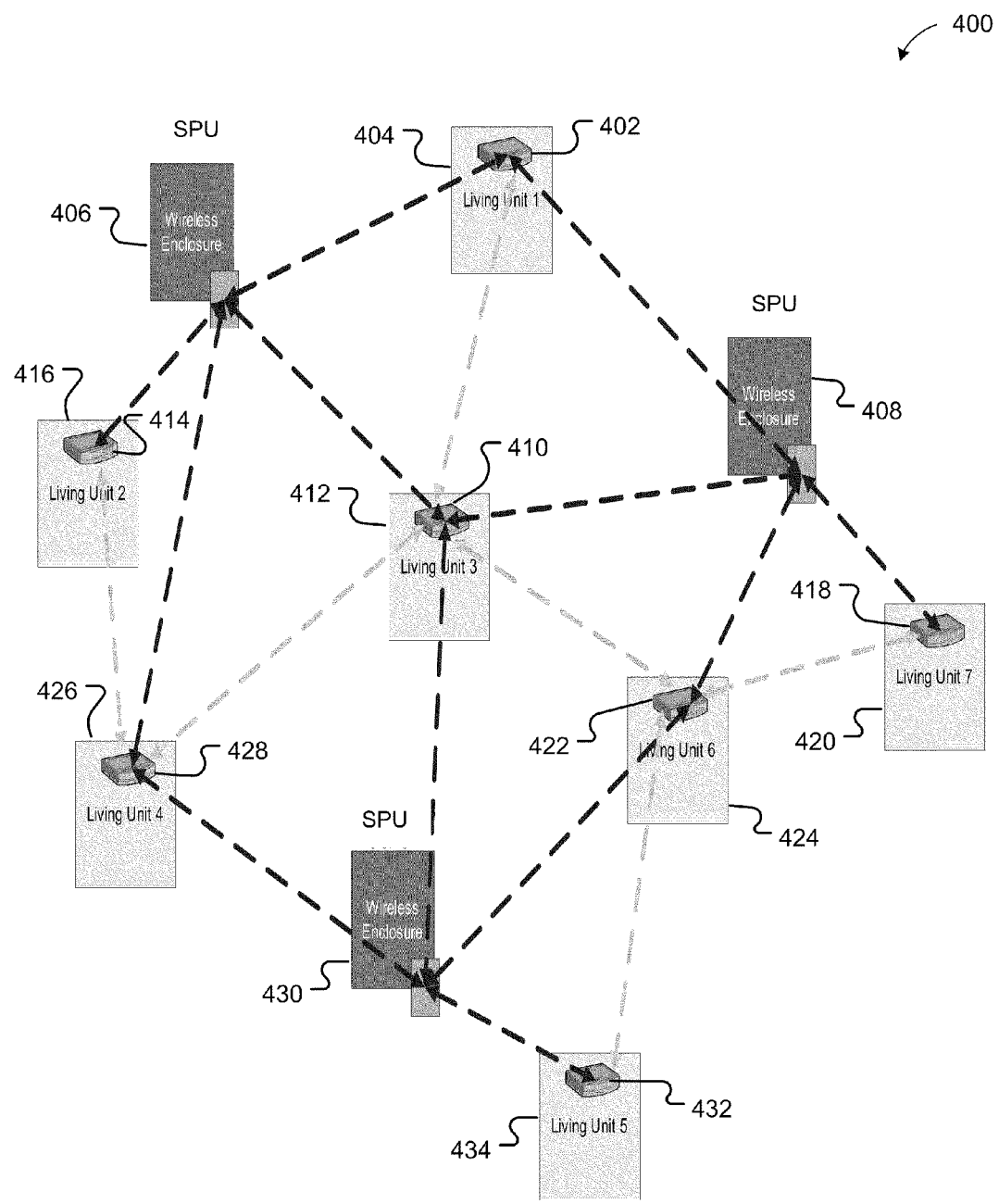
FIG. 4 is a block diagram of a fourth particular embodiment of a system to wirelessly transmit packet-based data to one or more residential gateways.

Referring to FIG. 4, a system 400 for transmitting packet-based data wirelessly to one or more residential gateways is depicted. FIG. 4 includes living units 404, 412, 416, 420, 424, 426, and 434. Such living units may be, for example, a house, an apartment, or a place of business. Each living unit includes a residential gateway 402, 410, 414, 418, 422, 428, and 432. The system 400 also includes service provider units 406, 408, and 430.

During operation, each residential gateway 402, 410, 414, 418, 422, 428, and 432 is configured to communicate with other residential gateways, as well as one or more service provider units 406, 408, and 430. For example, a particular residential gateway may receive packet-based data from another residential gateway or from one or more service provider units 406, 408, and 430 so long as the particular residential gateway is at an approved location. The system 400 therefore introduces a great deal of redundancy as packet-based data may be received at a particular residential gateway via a plurality of paths. The system 400 also may allow for intelligent routing of packet-based data to avoid over burdening a single path.

Figure 5:
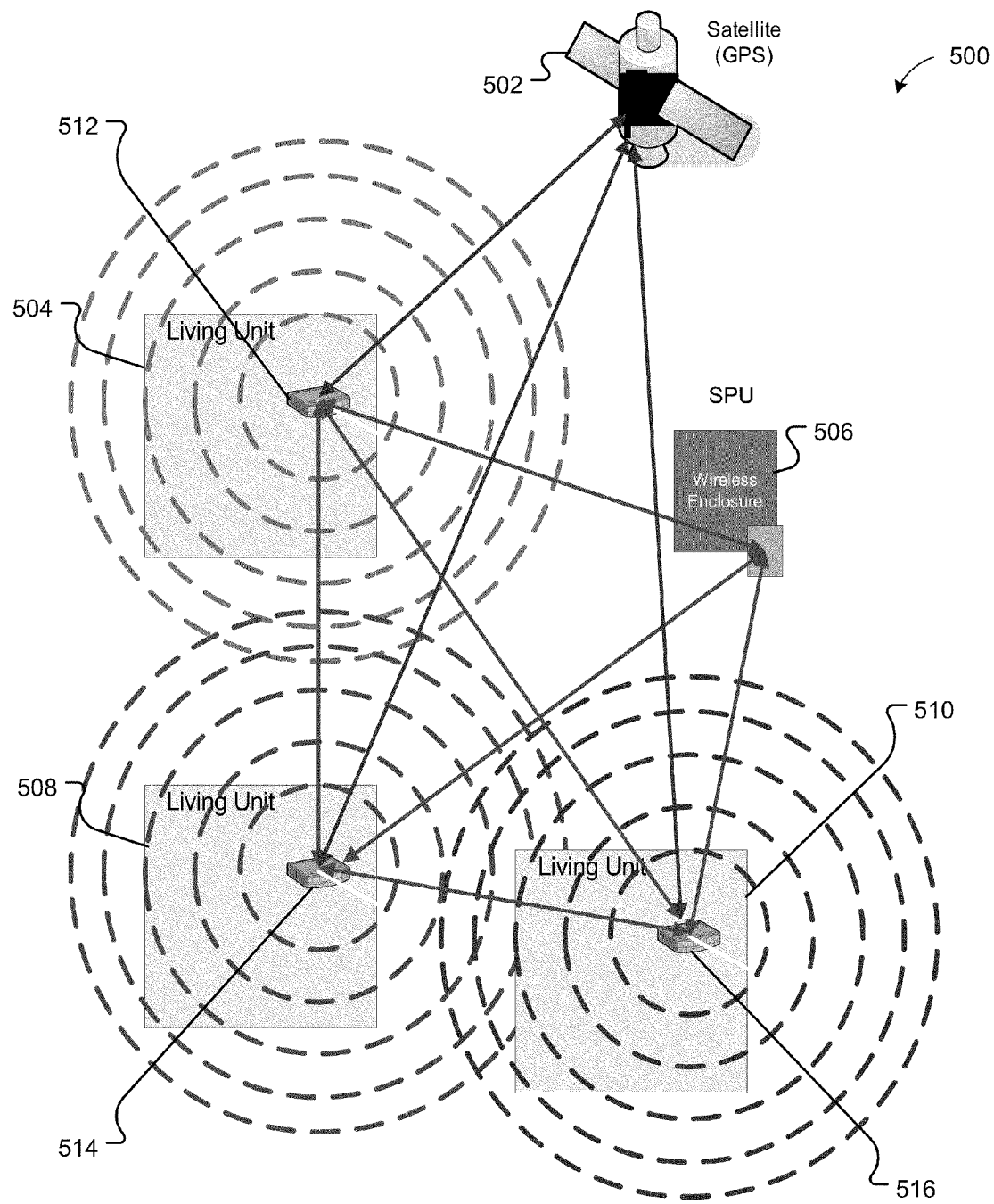
FIG. 5 is a diagram of a fifth particular embodiment of a system to wirelessly transmit packet-based data to one or more residential gateways.

Referring to FIG. 5, a system 500 for wireless transmission of packet-based data to one or more residential gateways is depicted. The system 500 includes living units 504, 508, and 510. Each living unit 504, 508, and 510 houses a residential gateway 512, 514, and 516. Each residential gateway 512, 514, and 516 is configured to communicate with a satellite 502 and a service provider unit 506. Each residential gateway 512, 514, and 516 may be configured to determine its own location. For example, each residential gateway 512, 514, and 516 may determine its own location based on GPS data received from the GPS satellite 502, based on a distance between a particular residential gateway and another residential gateway, or based on the distance between a particular residential gateway and the service provider unit 506.

Figure 6:
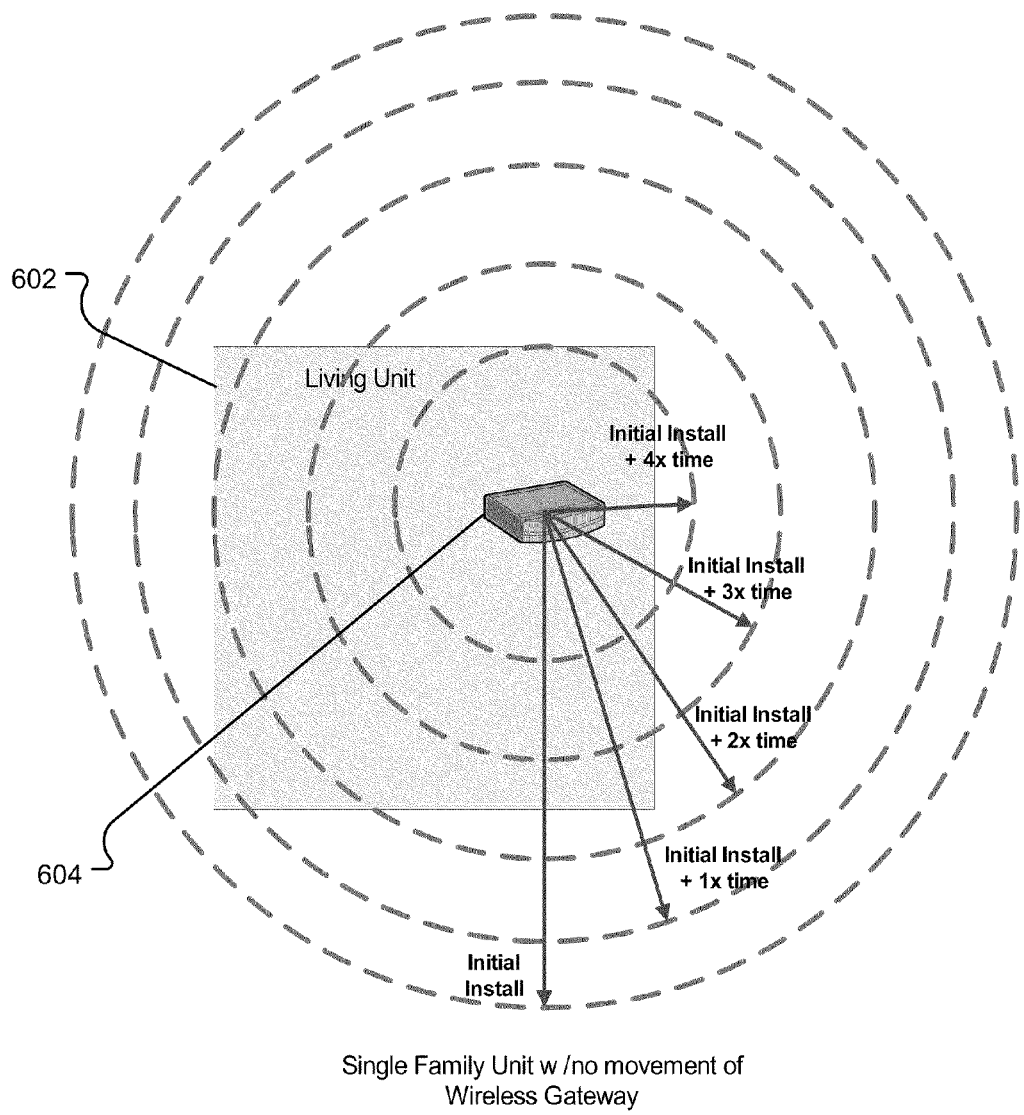
FIG. 6 is a diagram of a first particular embodiment of a residential gateway for wirelessly receiving packet-based data.

Referring to FIG. 6, an example residential gateway 604 is depicted as being within living unit 602. The residential gateway 604 may include all of the components and functionality as described above with to the residential gateway 364 of FIG. 3. The residential gateway 604 may initially be installed in an approved location that is defined by an initial radius. Over time, the radius that defines an approved location may be reduced so that the location of the residential gateway 604 can be determined with a greater degree of accuracy since the location of the residential gateway 604 may be identified as being within the area defined by the reduced radius. As long as the residential gateway 604 is not moved, the residential gateway 604 remains in the approved location identified by the reduced radius.

Figure 7:
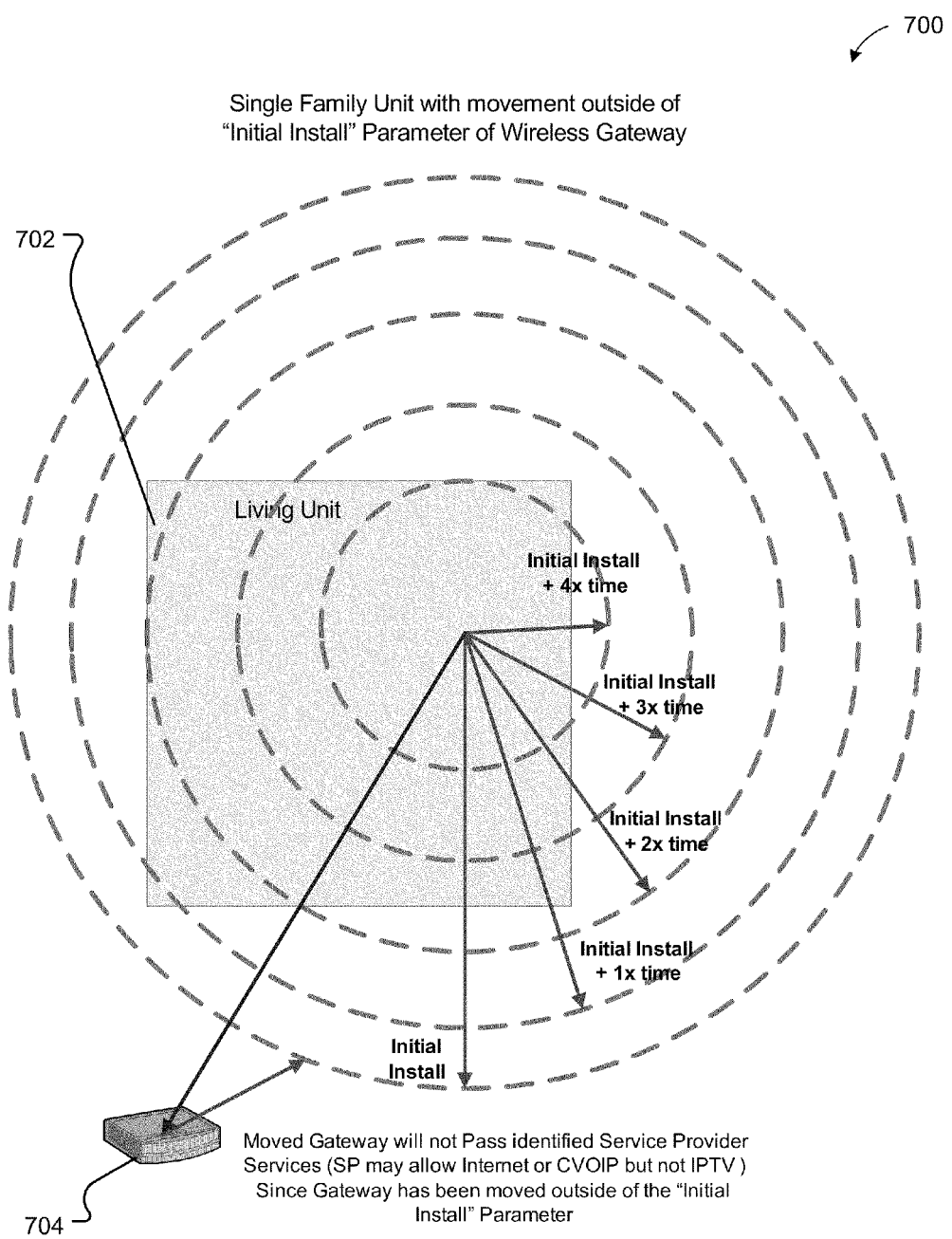
FIG. 7 is a diagram of a second particular embodiment of a residential gateway for wirelessly receiving packet-based data.

Referring to FIG. 7, a residential gateway 704 is depicted that is outside of living unit 702. In this example, the residential gateway 704 may initially be installed in an approved location that is defined by an initial radius from the residential gateway 704. Over time, the radius that defines an approved location may be reduced so that the location of the residential gateway 704 can be determined with a greater degree of accuracy since the location of the residential gateway 704 may be identified as being within the area defined by the reduced radius. In this example, the residential gateway 704 is subsequently moved to an area outside of the reduced radius. In such an example, the radius that defines an approved location for the residential gateway 704 may be incrementally increased until the approved location is defined by the initial radius from the initial installation of the residential gateway 704. In this example, the residential gateway has been moved outside of the approved location defined by the initial radius from the initial installation of the residential gateway 704, and the residential gateway 704 is therefore blocked from receiving at least some packet-based data from a service provider unit or other residential gateway.

Figure 8:
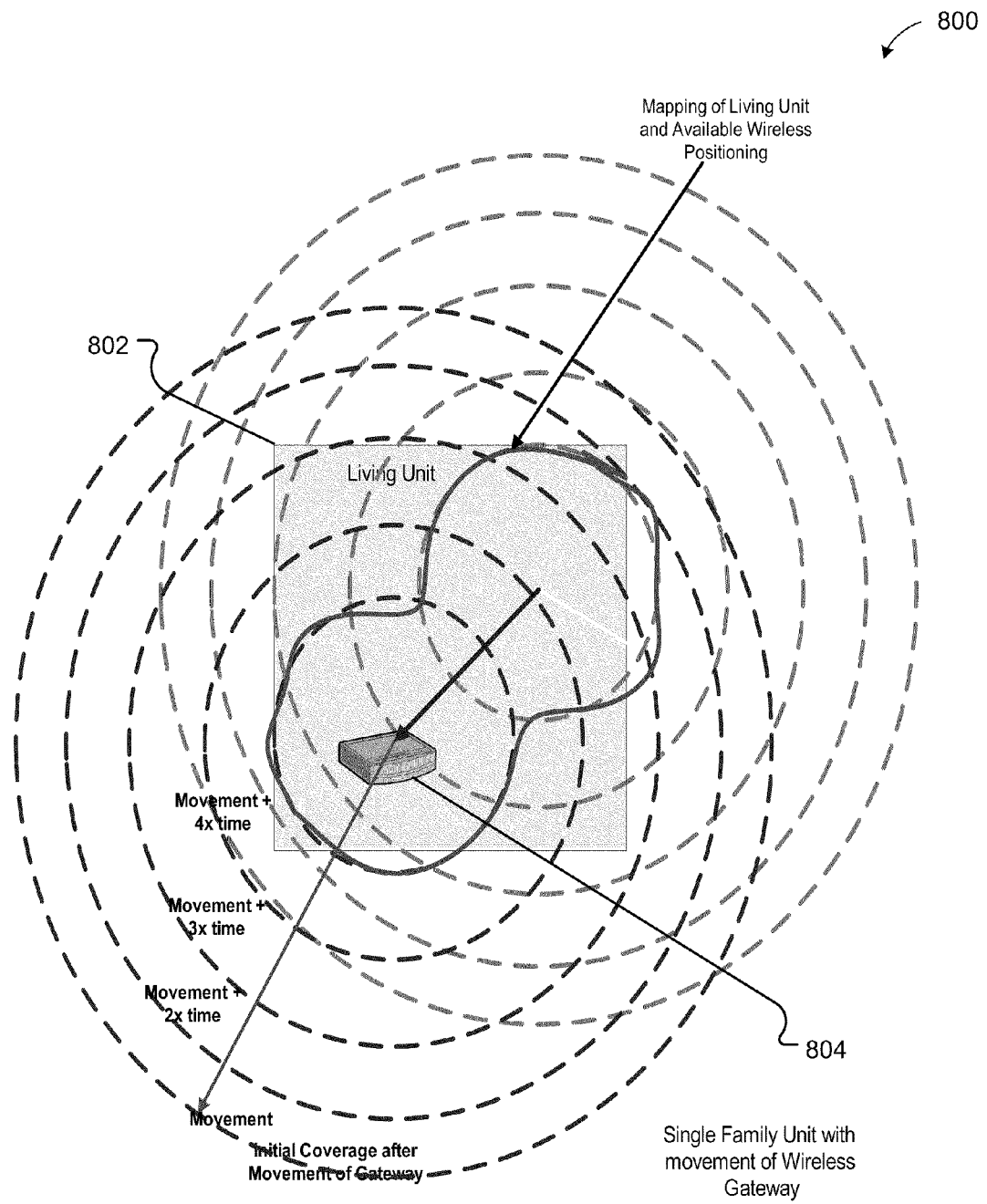
FIG. 8 is a diagram of a third particular embodiment of a residential gateway for wirelessly receiving packet-based data.

Referring to FIG. 8, a residential gateway 804 is depicted that is within living unit 802. In this example, the residential gateway 804 may initially be installed in an approved location that is defined by an initial radius from the residential gateway 804. Over time, the radius that defines an approved location may be reduced so that the location of the residential gateway 804 can be determined with a greater degree of accuracy since the location of the residential gateway 804 may be identified as being within the area defined by the reduced radius. In this example, the residential gateway 804 is subsequently moved to an area outside of the reduced radius. In such an example, the radius that defines an approved location for the residential gateway 804 may be incrementally increased until the approved location is defined by the initial radius from the initial installation of the residential gateway 804.

In this example, the residential gateway has been moved within the approved location defined by the initial radius from the initial installation of the residential gateway 804. In such an example, the location of the residential gateway 804 may more accurately be determined by reducing a radius around the new location of the residential gateway 804 and merging the areas defined by the reduced radius at the residential gateway's prior location and a reduced radius at the residential gateway's new location.

Figure 9:
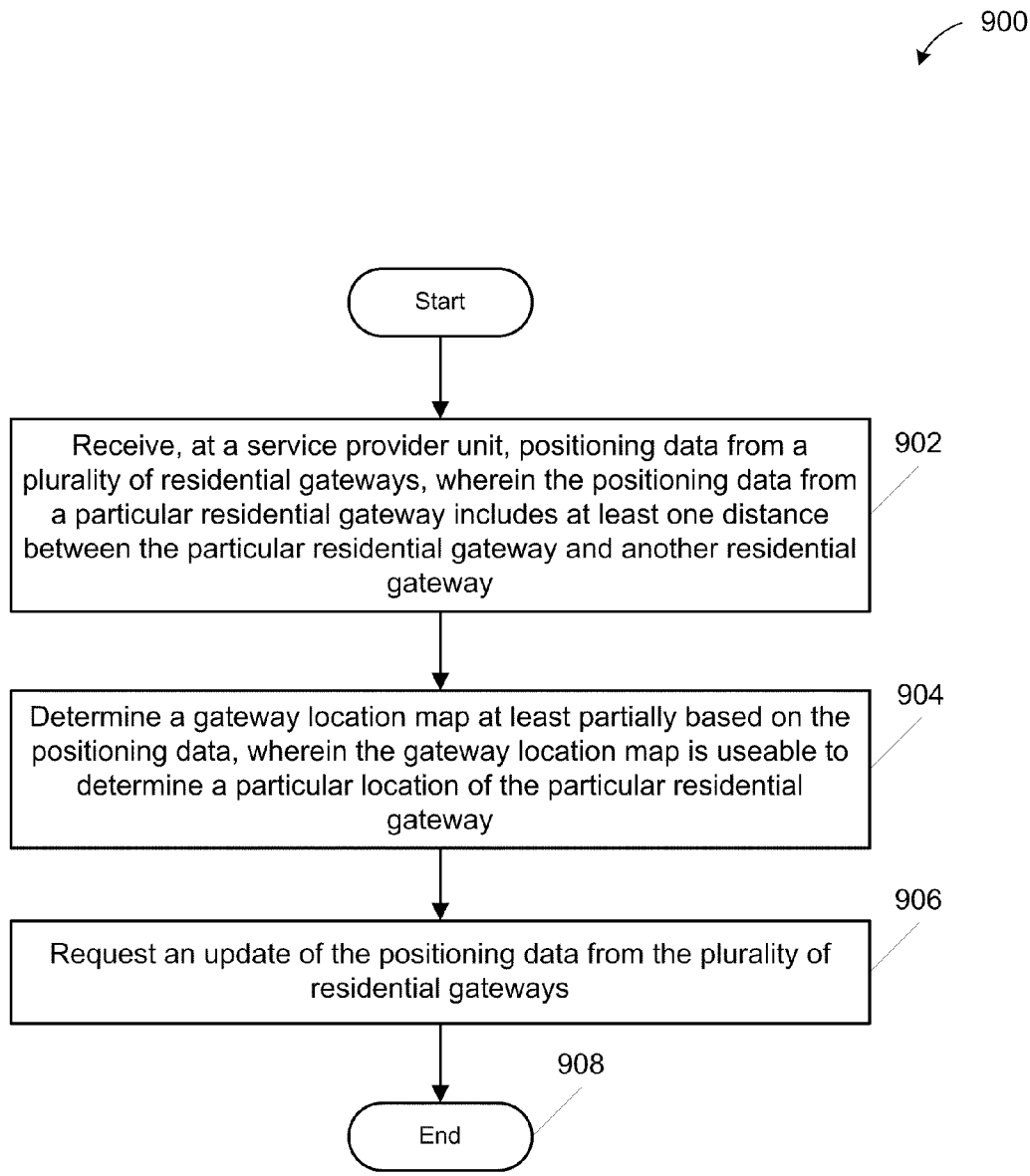
FIG. 9 is a flow diagram of a first particular embodiment of a method to determine a gateway location map at least partially based on positioning data from a plurality of residential gateways.

Referring to FIG. 9, a method of wireless transmission of packet-based data to one or more residential gateways is depicted and generally designated 900. At 902, a service provider unit may receive positioning data from a plurality of residential gateways. The positioning data from a particular residential gateway may include at least one distance between the particular gateway and another residential gateway. For example, in FIG. 2, the service provider unit 222 may receive positioning data 252 from the third residential gateway 260.

Moving to 904, the service provider unit can determine a gateway location at least partially based on the positioning data. The gateway location map may be usable to determine a particular location of the particular residential gateway. For example, in FIG. 2, the service provider unit 222 may determine a gateway location map 228 at least partially based on the gateway location data 230.

Moving to 906, the service provider unit may request an update of the positioning data from a plurality of residential gateways. For example, in FIG. 2, the service provider unit 222 may send an update request 244 to the second residential gateway 246 and the second residential gateway 246 may provide updated location data. The method terminates at 908.

Figure 10:
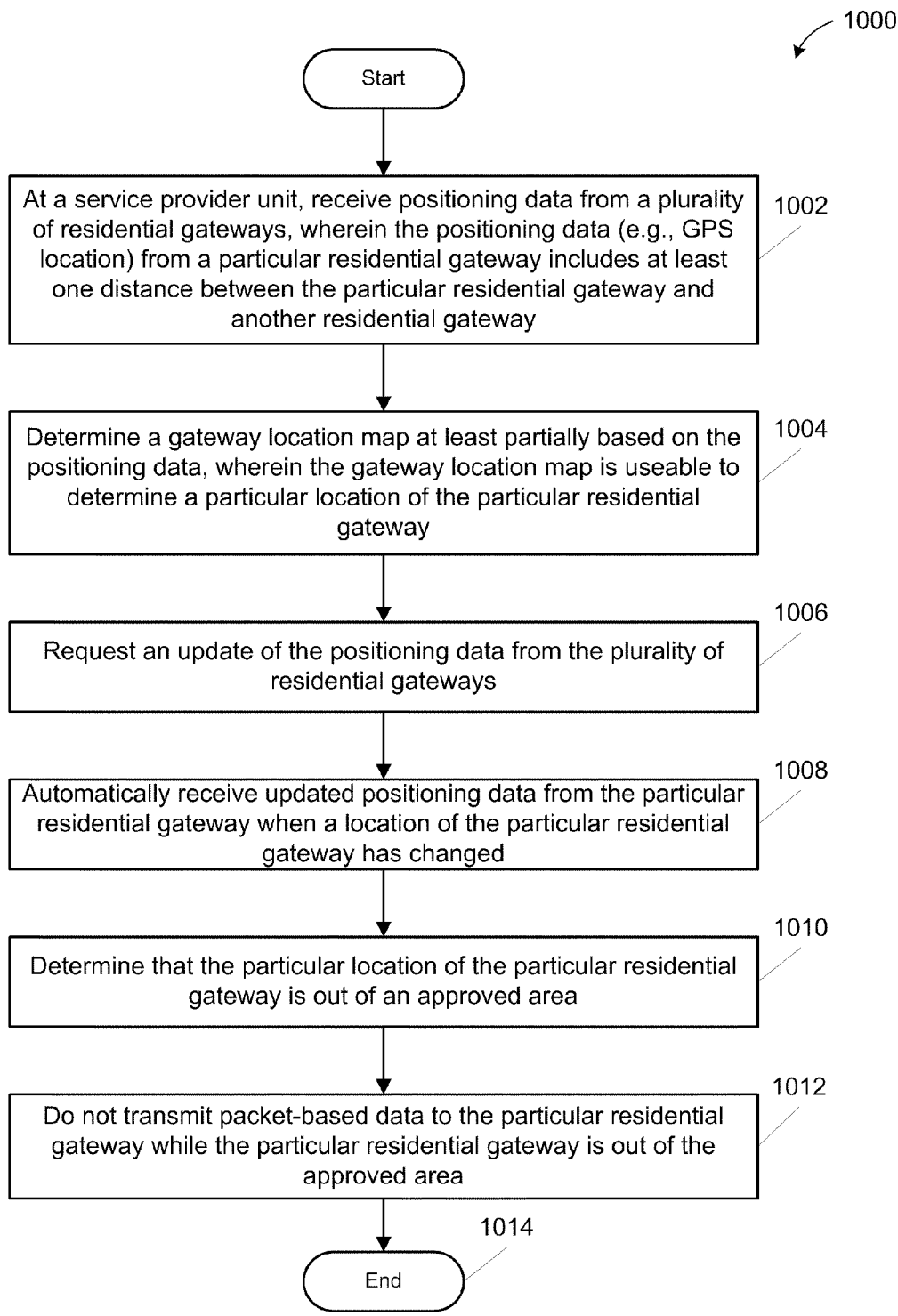
FIG. 10 is a flow diagram of a second particular embodiment of a method to determine a gateway location map at least partially based on positioning data from a plurality of residential gateways.

Referring to FIG. 10, a method for wireless transmission of packet-based data to one or more residential gateways is depicted and generally designated 1000. At 1002, a service provider unit can receive positioning data from a plurality of residential gateways. The positioning data from a particular residential gateway may include at least one distance between the particular residential gateway and another residential gateway. The positioning data may include a GPS location. For example, in FIG. 3, positioning data 314 received at the first service provider unit 310 may include satellite positioning data 340 received from the GPS satellite 344.

Moving to 1004, the service provider unit can determine a gateway location map at least partially based on the positioning data. The gateway location map may be usable to determine a particular location of the particular residential gateway. For example, in FIG. 2, the service provider unit 222 may determine a gateway location map 228 at least partially based on gateway location data 230.

Moving to 1006, the service provider unit can request an update of the positioning data from a plurality of residential gateways. For example, in FIG. 2, the service provider unit 222 may send an update request 244 to the second residential gateway 246 and the second residential gateway 246 may provide updated location data.

Moving to 1008, the service provider unit may automatically receive updated positioning data from a particular residential gateway when a location of a particular residential gateway is changed. For example, in FIG. 3, the residential gateway 364 includes a location determination module 372 that may periodically validate that the location of the residential gateway 364 has not changed. In the event that the residential gateway 364 determines that it has moved, the residential gateway 364 may be configured to send positioning data 314 to the first service provider unit 310. In such an example, the service provider unit 310 automatically receives updated position data 314 for the residential gateway 364 without initiating a request for the updated positioning data 314.

Moving to 1010, the service provider unit can determine that a particular location of a particular residential gateway is outside of an approved area. For example, in FIG. 2, the service provider unit 222, via the location verification module 232, can determine that the second residential gateway 246 is at an unapproved location 248 by comparing the approved location data 234 to the positioning data 242 provided by the second residential gateway 246. As a further example, upon determining that a particular location of a particular residential gateway is outside of an approved area, the service provider unit may discontinue transmission of packet-based data to the particular residential gateway while the particular residential gateway is outside of the approved area. In the event that the service provider unit receives an automatic update indicating that the particular residential gateway has been moved to an approved location, transmission of packet-based data to the particular residential gateway may be resumed.

Moving to 1012, the service provider unit may block transmission of packet-based data to a particular residential gateway while the particular residential gateway is outside of an approved area. For example, in FIG. 2, the service provider unit 222, via the blocking module 238, can block transmission of packet-based data to the second residential gateway 246 while the second residential gateway 246 is at an unapproved location 248. The method terminates at 1014.

The method 1000 therefore may enable a service provider to maintain location information for a plurality of residential gateways. In addition, a consumer of services delivered via the residential gateway may not need to provide updated address information because the system can periodically re-determine the location of the residential gateway. The service provider can therefore provide communication services to a residential gateway in compliance with contracted terms of use and in compliance with applicable laws.

Figure 11:
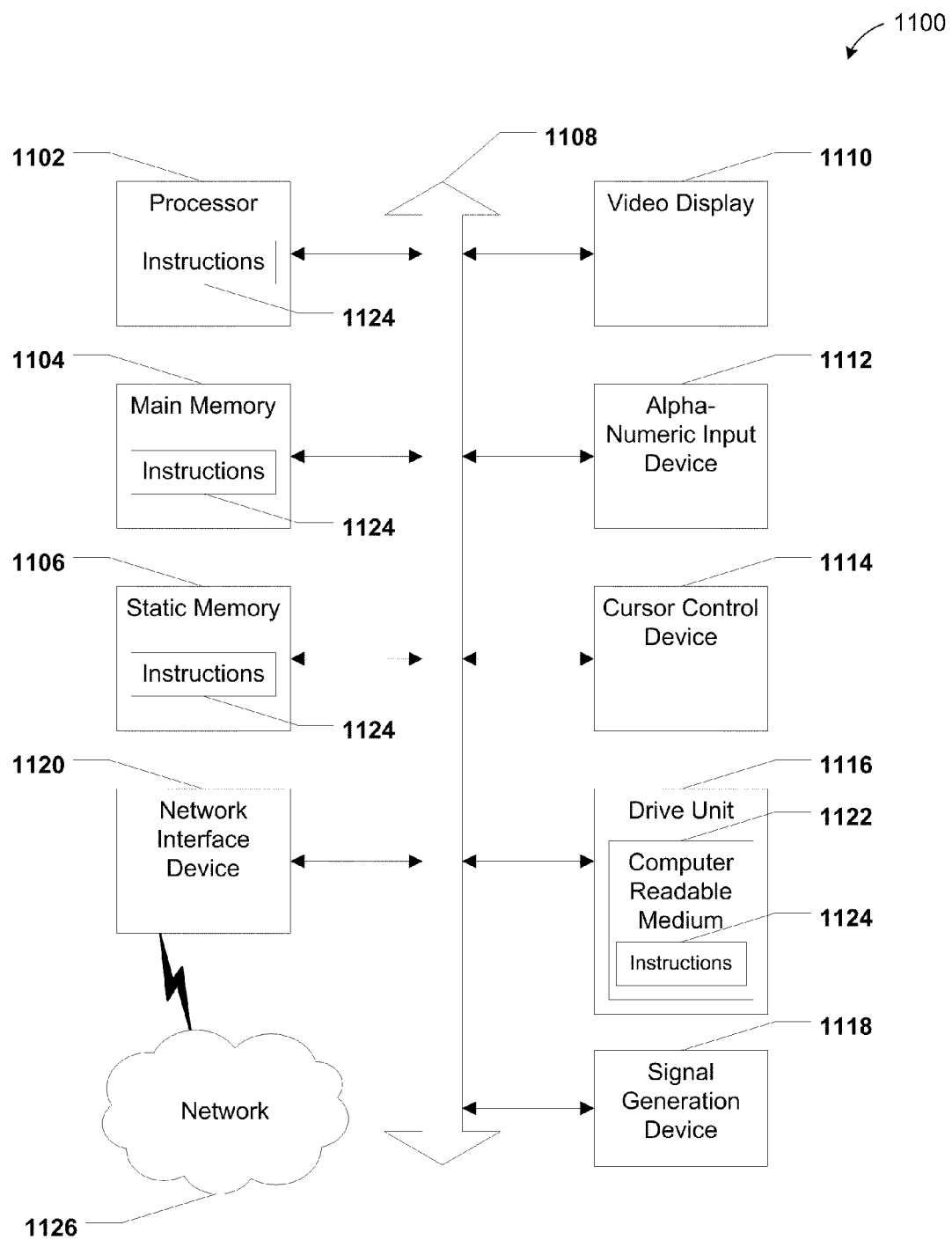
FIG. 11 is a block diagram of an illustrative embodiment of a general computer system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system 1100 may operate in the capacity of a server or as a client user computer in a server-client user network environment, or as a peer computer system in a peer-to-peer (or distributed) network environment. The computer system 1100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 1100 may be implemented using electronic devices that provide video, audio, or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 may include a main memory 1104 and a static memory 1106, which can communicate with each other via a bus 1108. As shown, the computer system 1100 may further include a video display unit 1110, such as a liquid crystal display (LCD), a projection television system, a flat panel display, or a solid state display. Additionally, the computer system 1100 may include an input device 1112, such as a keyboard, and a cursor control device 1114, such as a mouse. The computer system 1100 may also include a disk drive unit 1116, a signal generation device 1118, such as a speaker or remote control, and one or more network interface devices 1120 capable of communicating with a network 1126. Not all of the components of the computer system 1100 of FIG. 11 may be included. For example, some computer systems 1100 may not include an input device (e.g., a server may not include an input device).

In a particular embodiment, as depicted in FIG. 11, the disk drive unit 1116 may include a computer-readable storage medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1124, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 1124. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a processor; and
   a memory accessible to the processor, the memory including instructions, that when executed by the processor, cause the processor to perform operations comprising:
      receiving positioning data for a particular residential gateway device of a plurality of residential gateway devices from the particular residential gateway, wherein the particular residential gateway device is configured to send packet-based data to a user device when the particular residential gateway device is located in an approved area;
      determining whether the particular residential gateway device is located in the approved area by comparing the positioning data to approved location data for the particular residential gateway device; and blocking a portion of the packet-based data from being transmitted to the particular residential gateway device in response to determining that the particular residential gateway device is located outside of the approved area;

wherein the approved area is a first area during a first time period, wherein the first time period begins at installation of the particular residential gateway device;

wherein the approved area is a second area after the first time period, wherein the second area is smaller than the first area; and wherein blocking the packet-based data prevents the particular residential gateway device from sending the portion of the packet-based data to the user device.

2. The system of claim 1, wherein the packet-based data includes voice over Internet protocol data, Internet protocol television data, Internet data, or a combination thereof.

3. The system of claim 2, wherein the operations further comprise encrypting the packet-based data.

4. The system of claim 1, wherein the packet-based data is received from an Internet protocol television network over an optical link, a twisted pair coaxial link, or both.

5. The system of claim 1, wherein blocking the portion of the packet-based data comprises blocking internet protocol television data.

6. The system of claim 1, wherein blocking the portion of the packet-based data comprises blocking internet protocol television data while allowing voice over Internet protocol data to be transmitted to the particular residential gateway device.

7. The system of claim 1, wherein blocking the portion of the packet-based data comprises blocking internet protocol television data while allowing Internet data to be transmitted to the particular residential gateway device.

8. A residential gateway device comprising:
a processor; and
a memory accessible to the processor, the memory including instructions that, when executed by the processor, cause the processor to perform operations comprising:
determining a location of the residential gateway device;
determining whether the residential gateway device is located in an approved area based on a comparison of approved location data to the location of the residential gateway device;
preventing packet-based data from being received from a service provider unit in response to determining that the residential gateway device is located outside of the approved area;
receiving the packet-based data from a plurality of particular residential gateway devices, wherein the packet-based data is routed over a plurality of network paths via selected routes, and wherein the selected routes distribute a transmission burden among the plurality of network paths, wherein the packet-based data is received at the residential gateway device in response to determining that the residential gateway device is located in the approved area; and
causing received packet-based data to be transmitted to a user device.

9. The residential gateway device of claim 8, wherein the operations further comprise receiving satellite positioning data, wherein the location of the residential gateway device is determined based at least in part on the satellite positioning data.

10. The residential gateway device of claim 8, wherein the operations further comprise receiving positioning data associated with two service provider units, wherein the location of the residential gateway device is determined based on the positioning data.

11. The residential gateway device of claim 8, wherein the memory includes the approved location data, and wherein the approved location data includes information that indicates the approved area for the residential gateway device.

12. The residential gateway device of claim 8, wherein the user device is a set-top box, a home appliance, a gaming console, or a combination thereof 13. The residential gateway device claim 8, wherein the operations further comprise selectively requesting the packet-based data from a first service provider unit of a plurality of service provider units based on a property associated with each service provider unit of the plurality of service provider units, wherein the property includes a signal strength associated with each service provider unit of the plurality of service provider units, a maximum bandwidth of each service provider unit of the plurality of service provider units, an average bandwidth of each service provider unit of the plurality of service provider units, a number of open connections at each service provider unit of the plurality of service provider units, a proximity of each service provider unit of the plurality of service provider units, or a combination thereof, to the residential gateway device.

14. The residential gateway device claim 13, wherein the operations further comprise selectively requesting the packet-based data from a second residential gateway device in response to determining that a connection between the residential gateway device and the first service provider unit has terminated, and wherein the second residential gateway device is in communication with the residential gateway device.

15. The residential gateway of claim 8, wherein the packet-based data includes voice over Internet protocol data, Internet protocol television data, Internet data, or a combination thereof.

16. A method comprising:
receiving, at a service provider unit configured to transmit packet-based data to a plurality of residential gateway devices, positioning data from the plurality of residential gateway devices, wherein first positioning data received from a particular residential gateway device includes information indicating a distance between the particular residential gateway and another residential gateway device of the plurality of residential gateway devices; and
discontinuing transmission of at least a portion of the packet-based data to the particular residential gateway device in response to determining that the particular residential gateway device is located outside of an approved area based on a comparison of the first positioning data to approved location data for the particular residential gateway device;
wherein the particular residential gateway device is configured to transmit received packet-based data to a user device when the particular gateway device is located in the approved area, and wherein the packet-based data is transmitted to the particular residential gateway device in response to determining that the particular residential gateway device is located in the approved area; and
wherein the approved area of the particular residential gateway device is a first area during a first time period, wherein the first time period begins at installation of the particular residential gateway, wherein the approved area of the particular residential gateway device is a second area after the first time period, and wherein the second area is smaller than the first area.

17. The method of claim 16, wherein the positioning data received from the particular residential gateway device further includes information indicating a global positioning system location of the particular residential gateway device.

18. The method of claim 16, further comprising determining a gateway location map based on the positioning data received from the plurality of residential gateway devices, wherein the gateway location map includes information to determine a particular location of the particular residential gateway device.

19. The method of claim 18, further comprising automatically receiving updated positioning data from the particular residential gateway device when the particular location of the particular residential gateway has changed.

20. The method of claim 16, wherein the positioning data received from the particular residential gateway device is included in an emergency services voice over Internet protocol telephone call sent via the particular residential gateway device.

* * * * *